C. T. SMITH.
HITCHING WEIGHT LIFTER.
APPLICATION FILED JUNE 10, 1914. RENEWED SEPT. 18, 1916.
1,217,354.
Patented Feb. 27, 1917.
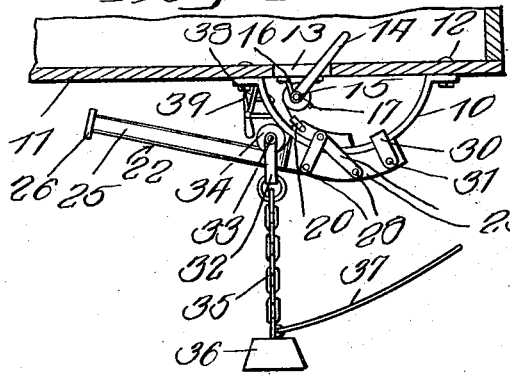
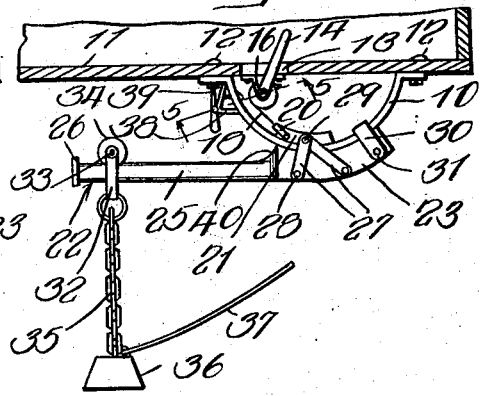
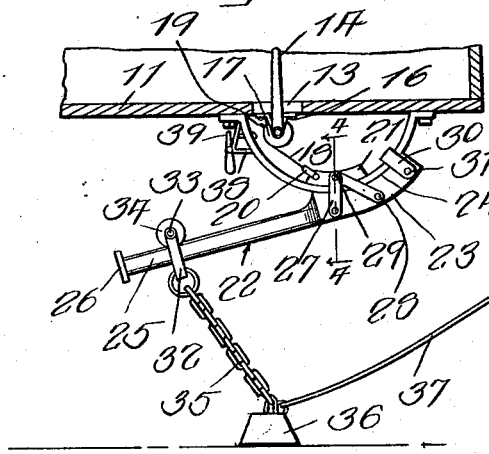
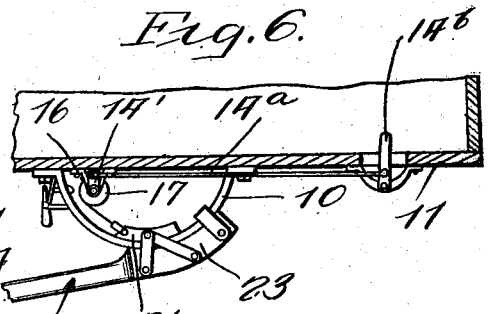
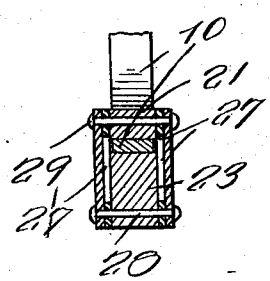
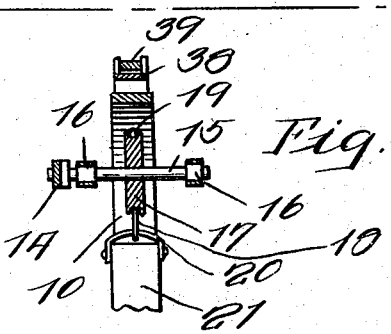
Witnesses
B. E. Bramm
S. P. Buck.
Inventor
C. T. Smith
By Chandler & Chandler
Attorneys

UNITED STATES PATENT OFFICE.

CORNELIUS T. SMITH, OF GRANDIN, ALBERTA, CANADA.

HITCHING-WEIGHT LIFTER.

1,217,354.  Specification of Letters Patent.  Patented Feb. 27, 1917.

Application filed June 10, 1914, Serial No. 844,343. Renewed September 18, 1916. Serial No. 120,885.

*To all whom it may concern:*

Be it known that I, CORNELIUS T. SMITH, a subject of the King of England, residing at Grandin, in the Province of Alberta, Dominion of Canada, have invented certain new and useful Improvements in Hitching-Weight Lifters; and I do hereby declare the following to be a full, clear, and exact description of the invention, such as will enable others skilled in the art to which it appertains to make and use the same.

This invention relates to weight lifters, and it more particularly relates to an attachment for wagons and other vehicles whereby the draft animals may be hitched to a weight carried by the vehicle and deposited on the street or ground.

An object of the invention is to provide an improved form of hitching-weight carrier which is easily operated from the interior of the vehicle by the driver simply removing his foot from a lever or pedal, for depositing said weight on the ground.

Another object is to provide for quickly raising the weight from the ground and thereby slacking the hitching rein or strap.

Another object is to provide an attachment of this character which may be quickly and easily secured to any ordinary carriage, wagon or other vehicle.

Another object is to provide a device of this character which is simple of construction, comparatively inexpensive, strong, durable, and thoroughly efficient.

Other objects and advantages may be recited hereinafter and in the claims.

In the accompanying drawings, which supplement this specification:—

Figure 1 is a sectional view longitudinally through the floor of a vehicle, with my improved weight lifter attached, as illustrated in side elevation.

Fig. 2 is a view, similar to Fig. 1, except that the weight is in its lowered and operative position.

Fig. 3 is a view, similar to Figs. 1 and 2, except that the lifter is in its operating or medial position.

Fig. 4 is an enlarged sectional view taken on the line 4—4 of Fig. 2.

Fig. 5 is an enlarged sectional view taken on the line 5—5 of Fig. 3, and

Fig. 6 is a view, similar to Fig. 2, of a somewhat modified form.

Referring to these drawings, in which similar reference characters correspond with similar parts, throughout the several views:

The semi-circular or arcuate hanger and track member 10 has its ends secured to the bottom 11 of the vehicle by means of bolts 12 which extend through the apertured ears of the member 10 and through the apertured bottom of the vehicle. This bottom is slotted at 13, and through this slot extends a foot-lever or pedal 14, which is formed on one end of a shaft 15, mounted in bearings 16, secured to the bottom 11. A pulley or sheave wheel 17 is secured on the shaft or axle 15, and one end of the cable or other flexible element 18 is secured to an eye 19 of the sheave wheel, and this cable connects with a U-shaped link or loop 20, the latter being secured to an arcuate or segmental block or traveler 21, slidably seated upon the top surface of the track member, and conforming to the inner concaved surface thereof.

The weight-carrying and weight-lifting lever or arm 22 consists of an arcuate end portion 23, the concaved surface 24 of which fits snugly upon the convexed surface of the track 10, while the substantially rectilinear free end portion 25 extends tangentially from the arcuate portion and has a stop element 26 at its end; said stop element being of any suitable material, and secured in any suitable way.

The block 21 and lever 22 are secured together by means of straps or links 27, which have their ends apertured, so as to register with apertures of the members 21 and 22, and to receive the bolts 28. The upper ends of the members 27 interlap, so that their apertures register and so that they may be secured to the block 21 by means of a bolt 29.

A substantially U-shaped clip 30 embraces the track 10 and has its end portions engaged with opposite sides of the member 22 and secured thereto by means of a bolt 31.

A substantially U-shaped yoke 32 has its ends apertured for the reception of an axle 33 on which is mounted a wheel 34, said wheel being seated upon the top of the element 25 and being adapted to roll back and forth thereon. To the lower part of this yoke 32 is secured a chain or other flexible element 35 which carries the hitching weight 36. A hitching rein 37 has its rear end secured to the weight, while its forward end is adapted to connect with the draft animals in any usual or preferred manner.

A bracket 38 is secured on the rear portion of the track 10, and on this bracket is pivotally mounted a weight-actuated pawl 39, which hangs directly over the element 25 and is in such proximal relation thereto that when the wheel 34 travels forwardly on the element 25, the top part thereof contacts with the lower end of the member 39 and raises it sufficiently to allow said wheel to pass thereunder, whereupon, said member or pawl returns by gravity to its normal position, so that if the weight should swing sufficiently to cause the wheel or roller 34 to tend to roll rearward on its support, the pawl prevents such rearward motion.

In operation, the lever 14 is pushed forward by the foot of the operator or driver, so as to rotate the shaft or axle and wheel 17, thereby winding the cable or flexible element 18 upon said wheel 17 so as to draw the members 21 and 22 and their adjuncts rearward along the arcuate track 10. Now, it will be seen that when the pedal or lever 14 is held in its forward position, the rear end of the element 25 is held up above its front end; so that it stands in a forwardly and downwardly inclined position, wherefore, the wheel 34 rests in the arcuate or concaved seat 40. The pedal may be held down by the foot of the operator, or it may be held by any desirable and suitable catch (not shown). When it is desired to leave the vehicle and to hitch the draft animal, the lever or pedal is released, so that the weight 36 draws the end of the element 25 downward, while the arcuate end 23 thereof slides upon the smooth under surface of the track 10, and the block 21 slides upon the smooth upper surface thereof. It will be seen that the foregoing movement of the members 21 and 22 bring them into the position illustrated in Figs. 2 and 6, so that the weight 36 now rests upon the ground, the wheel 34 being adjacent to the rear end of the element 25, and the hitching rein being drawn taut; so that, if the draft animal should now start forward, the hitching rein would effectually check said draft animal and prevent it from leaving the stopping place.

In lieu of the structure illustrated in the foregoing, I may provide a relatively short lever 14' on the shaft 15, and I may extend a link 14ª forwardly and connect it with a lever or pedal member 14ᵇ, so that the hitching device may be located rearwardly of or substantially under the driver's seat, the pedal 14ᵇ being in convenient position for operation by the foot of the driver. From this modified form, it is made clearly obvious that the position of the rod 14ª and the length thereof may be changed to suit the particular requirements of each case, so that this form of weight-raiser or hitching appliance may be easily attached to any form of vehicle.

From the foregoing, it will be seen that I have provided a device for raising and holding and lowering a hitching weight, which is fully capable of attaining the foregoing objects, in a thoroughly practical and efficient manner.

I do not limit my invention to the exact details of construction, combination and arrangement of parts, as herewith illustrated and described, but my invention may only be limited by a reasonable interpretation of the claims.

I claim:

1. A weight lifter consisting of an arcuate track, a member consisting of an arcuate end portion and an elongated rectilinear portion, a wheel adapted to roll on said elongated rectilinear portion, means coacting with the wheel for supporting a weight, means for securing the arcuate end portion in slidable engagement with the arcuate track, and means for moving said member along said arcuate track.

2. A hitching attachment consisting of an arcuate track adapted to be secured to the underside of a vehicle body and to curve downwardly, a shaft having a pulley thereon and adapted to be rotatably mounted between the extremities of the arcuate member, a weight-lifting member comprising an arcuate element and a rectilinear element, a weight, means supported by the weight-lifting member and coacting therewith for supporting the weight and adapted to move longitudinally of the weight-lifting member, means for securing the arcuate element in slidable engagement with the arcuate track, a flexible element connected with the last said means and with said pulley for moving the arcuate element along the arcuate track, and a hitching rein connected to the weight.

3. A hitching device adapted to be attached to the under surface of a vehicle body and comprising an arcuate track, a lifter member having an arcuate surface in slidable engagement with the arcuate track and having a tangential arm extending from said arcuate element, a segmental block having its convexed surface in sliding engagement with the concaved surface of the arcuate track, straps extending across the track and connecting the arcuate element with said block, a pulley, a flexible member connecting the pulley with the block, means for rotating the pulley, a wheel mounted to roll on the tangential element, a weight, a hitching rein connected to the weight, means connected to the wheel for supporting the weight, and a pawl supported over the tangential element and adapted to contact with the wheel for preventing its untimely travel in one direction.

4. The combination with a vehicle having an apertured and slotted floor, a downwardly convexed and upwardly concaved track having apertured ends, bolts extending through the apertures of the floor and of the track for securing the latter to the floor, bearings adjacent to the slot of the floor and between the apertures thereof, an axle supported by the bearings and carrying a lever and a pulley, a traveler mounted for movement on the concaved surface of the track, means connecting the traveler with the pulley and coacting with the latter for moving the traveler, a lifter member supported by the traveler and comprising an arm which extends substantially tangentially from the track, a weight, a hitching strap connected to the weight, and means connecting the weight with the arm and adapted to move along said arm for carrying the weight forwardly and rearwardly of the vehicle.

In testimony whereof, I affix my signature, in the presence of two witnesses.

CORNELIUS T. SMITH.

Witnesses:
  WM. T. REID,
  L. DICKSON.

Copies of this patent may be obtained for five cents each, by addressing the "Commissioner of Patents, Washington, D. C."